(12) United States Patent
Haruo et al.

(10) Patent No.: US 7,244,378 B2
(45) Date of Patent: *Jul. 17, 2007

(54) MOLD CLAMPING FORCE CORRECTION METHOD FOR TOGGLE-TYPE MOLD CLAMPING APPARATUS

(75) Inventors: Okada Haruo, Nagano (JP); Miyajima Masahiko, Nagano (JP); Hakoda Takashi, Nagano (JP)

(73) Assignee: Nissei Plastic Industrial Co., Ltd., Nageno-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/980,780

(22) Filed: Nov. 4, 2004

(65) Prior Publication Data
US 2005/0098912 A1    May 12, 2005

(30) Foreign Application Priority Data
Nov. 7, 2003    (JP) .............................. 2003-377884

(51) Int. Cl.
*B29C 45/64*    (2006.01)
*B29C 45/80*    (2006.01)

(52) U.S. Cl. ................. 264/40.1; 264/40.5; 264/328.1; 425/138; 425/150; 425/589; 425/593

(58) Field of Classification Search .............. 264/40.1, 264/40.5, 328.1; 425/137, 138, 150, 589, 425/595, 593
See application file for complete search history.

(56) References Cited

U.S. PATENT DOCUMENTS

| | | | | |
|---|---|---|---|---|
| 5,425,905 A | * | 6/1995 | Herbst | ......................... 264/39 |
| 5,440,213 A | * | 8/1995 | Arita et al. | ............ 318/568.11 |
| 6,409,495 B1 | * | 6/2002 | Kamiguchi et al. | ......... 425/150 |
| 2004/0067276 A1 | * | 4/2004 | Watanabe | ................... 425/595 |

FOREIGN PATENT DOCUMENTS

| | | |
|---|---|---|
| JP | 62-32020 A | 2/1987 |
| JP | 6-61806 B2 | 8/1994 |
| JP | 6-232020 A | 8/1994 |

* cited by examiner

*Primary Examiner*—Jill L. Heitbrink
(74) *Attorney, Agent, or Firm*—Birch, Stewart, Kolasch, & Birch, LLP

(57) ABSTRACT

A clamping apparatus is operable in a closure position detection mode for detecting closure of a mold on the basis of a change in a physical quantity because of closure of the mold, detecting a position of a crosshead of a toggle mechanism at the time of detection of the closure, and obtaining a closure position of a movable platen at the time of the closure from the detected position of the crosshead. The apparatus is previously operated in the closure position detection mode to store, as a reference value, the closure position at which a target mold clamping force is obtained. In the production operation, the apparatus is operated in the closure position detection mode to obtain an actual closure position (detection value). The mold clamping force is corrected on the basis of a deviation of the detection value from the reference value.

18 Claims, 7 Drawing Sheets

MOLD CLAMPING FORCE CORRECTION METHOD FOR TOGGLE-TYPE MOLD CLAMPING APPARATUS

BACKGROUND OF THE INVENTION

1. Field of the Invention

The present invention relates to a mold clamping force correction method for a toggle-type mold clamping apparatus, which method is suitable for correcting mold clamping force, which changes during production operation, to a correct clamping force.

2. Description of the Related Art

A conventional toggle-type mold clamping apparatus for clamping a mold of an injection molding machine is disclosed in, for example, Japanese Patent Publication (kokoku) No. 6(1994)-61806. As disclosed in this publication, a toggle-type mold clamping apparatus includes a toggle mechanism which connects a movable platen for supporting a movable mold half and a crosshead advanced and retracted by a drive unit, and has a function of transmitting pressing force of the crosshead to the movable platen while amplifying the force. In such a mold clamping apparatus, when the toggle mechanism is completely extended, a predetermined mold clamping force determined on the basis of an extension of tie bars is generated. As shown in FIG. 8, in a mold clamping operation, high-speed mold closing is typically performed from a mold open position Xa, and the operation mode is switched to low-speed mold closing at a predetermined low-speed changeover position Xb. The period during which the low-speed mold closing is performed serves as a foreign object detection zone, during which a molded product not having been properly ejected or the like is detected as a foreign object. When a predetermined high-pressure changeover position Xc is reached, the operation mode is switched to high-pressure mold clamping so as to clamp the mold under high pressure. In FIG. 8, Xd shows a mold clamping end position. Load torque T of a drive motor for driving the mold clamping apparatus changes as shown in FIG. 8 during the mold clamping operation.

Incidentally, unlike a direct-pressure-application-type mold clamping apparatus, because of its operation principle, a toggle-type mold clamping apparatus has a drawback in that slight expansion or contraction of a mold and tie bars, stemming from disturbing factors such as heating temperature of the mold and ambient temperature, causes a considerable change in mold clamping force, which results in deterioration in quality, in particular at the time of molding of precision products. FIG. 9 shows a change in mold clamping force Fm with time for the case where the correct value (target value) of mold clamping force Fm is 400 kN. As is apparent from FIG. 9, during a period in which the mold temperature elevates, the mold clamping force Fm increases from 400 kN to 500 kN because of thermal expansion of the mold. After completion of the temperature elevation, since heat is transferred from the mold to the tie bars, the tie bars expand, whereby the mold clamping force Fm gradually decreases. Notably, thermal expansion of the mold is a factor which increases the mold clamping force Fm, and thermal expansion of the tie bars is a factor which decreases the mold clamping force Fm.

As described above, in a toggle-type mold clamping apparatus, disturbing factors such as heating temperature of a mold and ambient temperature are influential factors which must be taken into consideration so as to accurately maintain the mold clamping force Fm. Japanese Patent Application Laid-Open (kokai) No. 62(1987)-32020 discloses a mold clamping force control method which can cope with such disturbing factors. In the disclosed method, the thickness of a mold or a mold clamping force during a molding operation is detected by means of mold-thickness detection means consisting of an optical or magnetic scale supported on a stationary mold plate and a position detector disposed on a movable mold plate, and a correction value determined from the detected thickness and its target value is fed back to mold-thickness adjustment means, whereby mold clamping force is maintained constant.

However, the mold clamping force control method disclosed in the publication has the following problems.

First, as described above, in a toggle-type mold clamping apparatus, slight expansion or contraction of a mold results in a considerable change in mold clamping force. Since the conventional mold clamping force control method detects the thickness of a mold (mold clamping force) by use of mold-thickness detection means consisting of a scale supported on a stationary mold plate and a position detector disposed on a movable mold plate; i.e., the method detects slight expansion and contraction, the method cannot accurately detect mold clamping force, and thus cannot perform accurate correction of mold clamping force.

Second, since the thickness of a mold (e.g., position of a pressure receiving plate) is detected directly, separate mold-thickness detection means such as a scale and a position detector are needed, leading to an increase in the number of parts, higher cost, and increased degree of complexity of configuration; in particular, an increased degree of complexity of the structure around a mold.

SUMMARY OF THE INVENTION

An object of the present invention is to provide a mold clamping force correction method for a toggle-type mold clamping apparatus, which method is capable of accurately detecting a closure position of a movable platen and accurately detecting change in mold clamping force, to thereby perform accurate correction of mold clamping force.

Another object of the present invention is to provide a mold clamping force correction method for a toggle-type mold clamping apparatus, which method can eliminate the necessity for mold-thickness detection means, such as a scale and a position detector, for directly detecting the thickness of a mold, to thereby lower cost through reduction in the number of parts, and prevent the structure around a mold from becoming complex.

To achieve the above object, the present invention provides a mold clamping force correction method for a toggle-type mold clamping apparatus including a movable platen and a toggle mechanism for moving the movable platen in which change in mold clamping force is detected during production operation, and the mold clamping force is corrected on the basis of the detected change. According to the method, a closure position detection mode is provided so as to detect closure of a mold on the basis of a change in a physical quantity because of closure of the mold, detect a position of a crosshead of the toggle mechanism at the time of detection of the closure of the mold, and obtain a position (closure position) of the movable platen at the time of the closure of the mold from the detected position of the crosshead. The mold clamping apparatus is previously operated in the closure position detection mode so as to store, as a reference value, the closure position at which a target mold clamping force is obtained. In the production operation, the mold clamping apparatus is operated in the closure position detection mode so as to obtain an actual closure position (detection value). The mold clamping force is corrected on the basis of a deviation of the detection value from the reference value.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the structure of a toggle-type mold clamping apparatus Mc to which a mold clamping force correction method according to the present embodiment can be applied will be described with reference to FIGS. 6 and 7.

Figure 6:
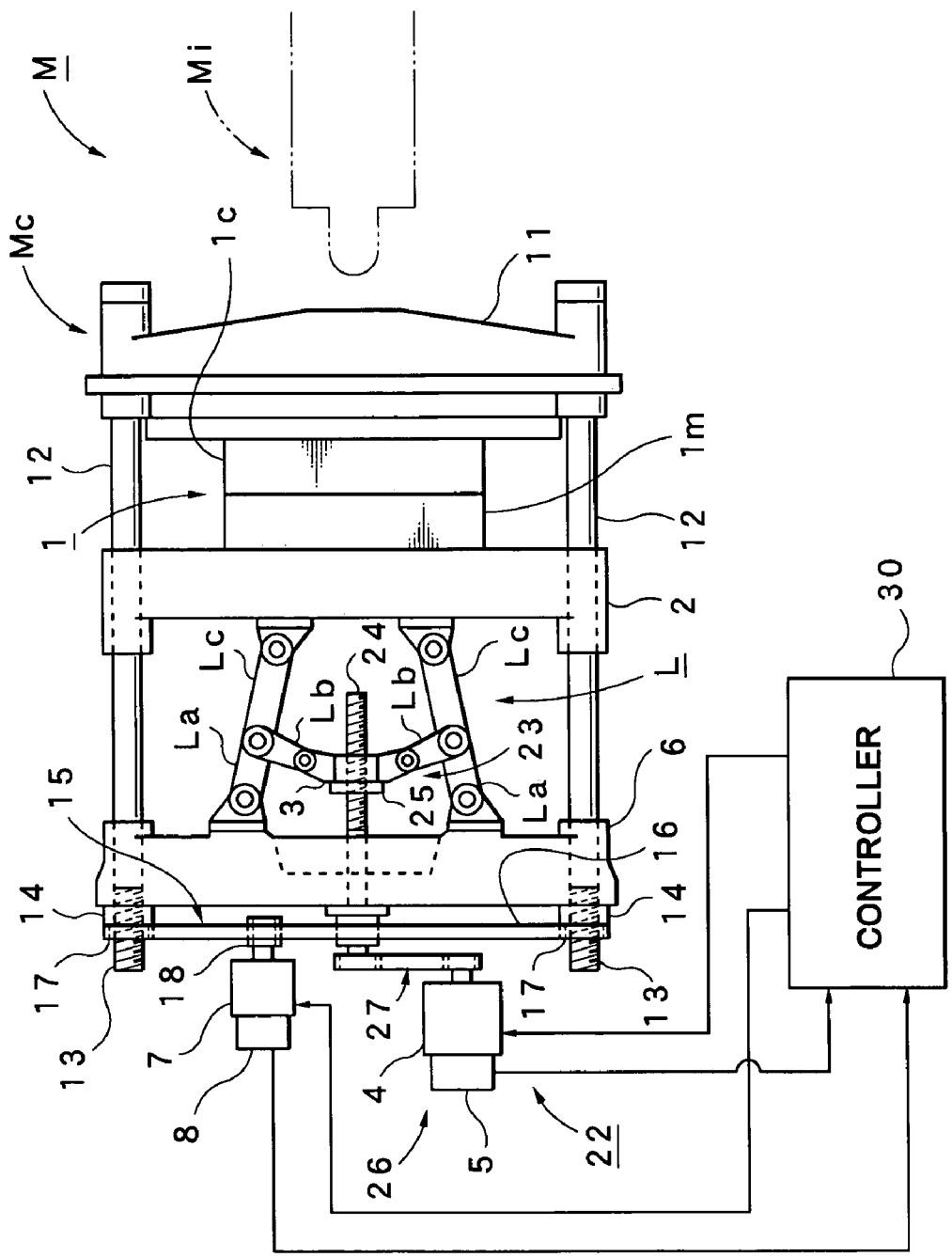
FIG. 6 is a view showing the structure of a toggle-type mold clamping apparatus for which the mold clamping force correction method is performed.

FIG. 6 shows an injection molding machine M including a toggle-link-type mold clamping apparatus Mc and an injection apparatus Mi. The mold clamping apparatus Mc includes a stationary platen 11 and a pressure-receiving platen 6 which are separated from each other. The stationary platen 11 is fixedly mounted on an unillustrated machine base, and the pressure-receiving platen 6 is mounted on the machine base in such a manner that it can advance and retract. Four tie bars 12 extend between the stationary platen 11 and the pressure-receiving platen 6. Front ends of the tie bars 12 are fixed to the stationary platen 11, and rear ends of the tie bars 12 pass through the pressure-receiving platen 6. Adjustment nuts 14, which also serve as stoppers for the pressure-receiving platen 6, are in screw-engagement with male threads 13 formed at the rear ends of the tie bars 12.

The adjustment nuts 14 constitute a mold-thickness adjustment mechanism for adjusting the position of the pressure-receiving platen 6. This mold-thickness adjustment mechanism includes an adjustment drive mechanism section for rotating the adjustment nuts 14. The adjustment drive mechanism section includes a drive motor 7 for moving the pressure-receiving platen; a rotary encoder 8 attached to the drive motor 7 so as to detect rotation of the drive motor 7; and a transmission mechanism 15 for simultaneously transmitting rotation of the drive motor 7 to the adjustment nuts 14. For such transmission, the transmission mechanism 15 includes a timing belt 16 wound around the four adjustment nuts 14 and a drive gear 18 attached to a shaft of the drive motor 7 in such a manner that the timing belt 16 engages gear portions 17 of the adjustment nuts 14 and the drive gear 18.

By virtue of this configuration, when the drive motor 7 is operated, rotation of the drive gear 18 is transmitted to the gear portions 17 of the adjustment nuts 14 via the timing belt 16, whereby the adjustment nuts 14 rotate, and advance or retract along the male thread portions 13 of the tie bars 12. As a result, the pressure-receiving platen 6 advances or retracts, whereby the position of the pressure-receiving platen 6 in the forward/backward direction can be adjusted.

Meanwhile, a movable platen 2 is mounted slidably on the tie bars 12. The movable platen 2 supports a movable mold half 1m, and the stationary platen 11 supports a stationary mold half 1c. The movable mold half 1m and the stationary mold half 1c constitute a mold 1. A toggle link mechanism L is disposed between the pressure-receiving platen 6 and the movable platen 2. The toggle link mechanism L includes a pair of first links La coupled to the pressure-receiving platen 6; a pair of output links Lc coupled to the movable platen 2; and a pair of second links Lb coupled to connecting rods which connect the first links La and the output links Lc. A crosshead 3 is coupled to the second links Lb.

Moreover, a mold-clamping drive section 22 is disposed between the pressure-receiving platen 6 and the crosshead 3. The mold clamping drive section 22 includes a ball screw mechanism 23, which consists of a ball screw 24 rotatably supported on the pressure-receiving platen 6 and a ball nut 25 in screw-engagement with the ball screw 24 and fixed to the crosshead 3; and a rotation drive mechanism section 26 for rotating the ball screw 24. The rotation drive mechanism section 26 includes a servomotor 4 for mold clamping; a rotary encoder 5 attached to the servomotor 4 so as to detect rotation of the servomotor 4; and a rotation transmission section 27 for transmitting rotation of the servomotor 4 to the ball screw 24. The rotation transmission section 27 includes a driven gear attached to the ball screw 24, a drive gear attached to a shaft of the servomotor 4, and a timing belt wound around the drive gear and the driven gear.

By virtue of this configuration, when the servomotor 4 is operated, rotation of the servomotor 4 is transmitted to the ball screw 24 via the rotation transmission section 27, whereby the ball screw 24 rotates, and thus, the ball nut 25 advances or retracts. As a result, the crosshead 3, with which the ball nut 25 is integrated, advances or retracts, and the toggle link mechanism L is contracted or expanded, whereby the movable platen 2 moves in a mold opening direction (retracting direction) or in a mold closing direction (advancing direction). Reference numeral 30 denotes a controller, to which the servomotor 4 for mold clamping, the rotary encoder 5, the drive motor 7 for moving the pressure-receiving platen, and the rotary encoder 8 are connected.

Figure 7:
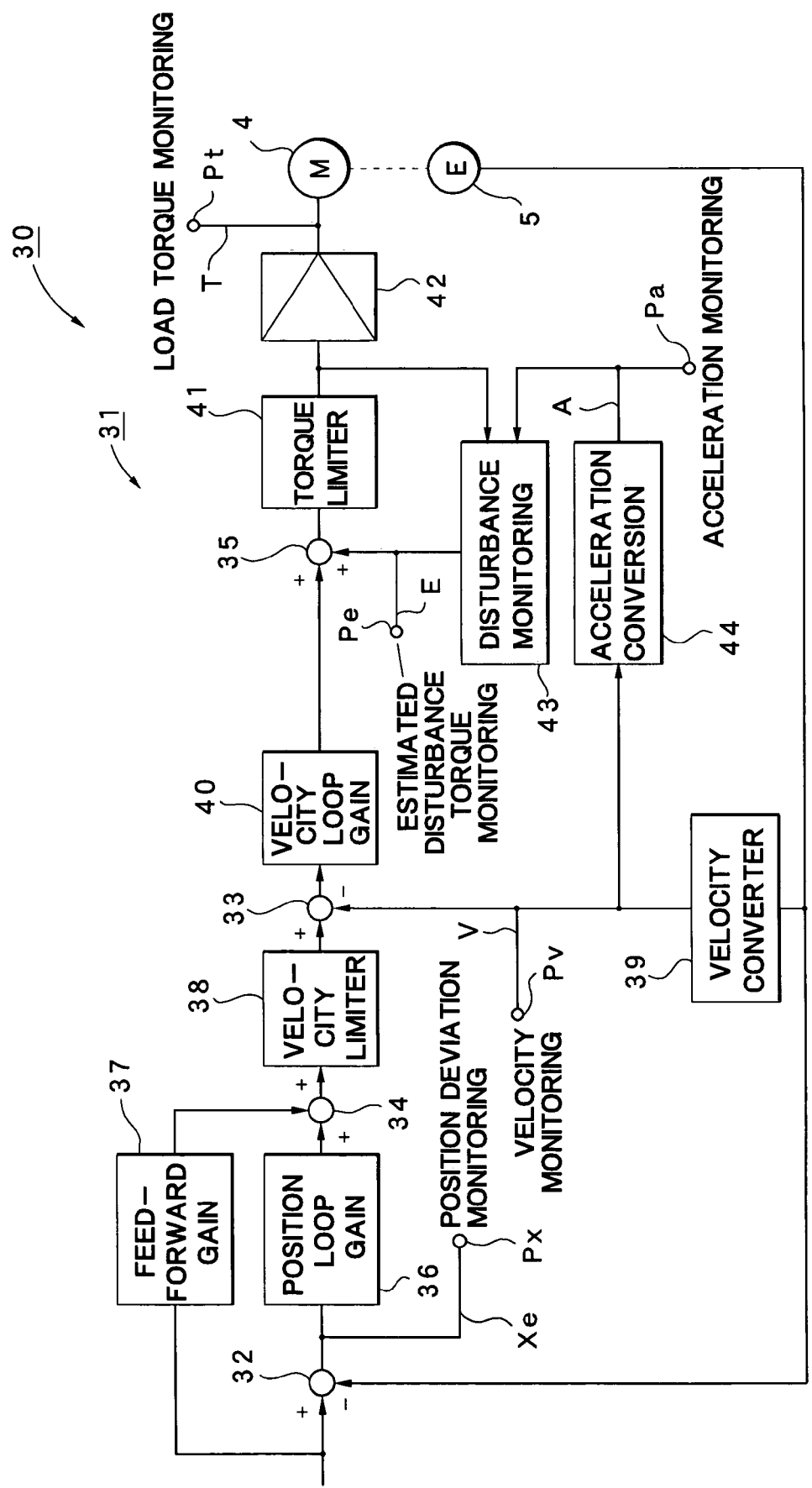
FIG. 7 is a block circuit diagram showing a portion of a controller provided for the toggle-type mold clamping apparatus.

FIG. 7 shows a servo circuit 31, which is a portion of the controller 30. The servo circuit 31 includes deviation calculation sections 32 and 33; adders 34 and 35; a positional-loop-gain setting section 36; a feed-forward-gain setting unit 37; a velocity limiter 38, a velocity converter (differentiator) 39; a velocity-loop-gain setting section 40; a torque limiter 41; a driver 42; a disturbance monitoring section 43; and an acceleration converter (differentiator) 44. Thus, the system shown in FIG. 7 constitutes a servo control system (servo circuit 31). The above-mentioned servomotor 4 for mold clamping is connected to the output side of the driver 42, and the rotary encoder 5 attached to the servomotor 4 is connected to the inverted input sections of the velocity converter 39 and the deviation calculation section 32. The non-inverted input section of the deviation calculation section 32 is connected to an unillustrated sequence controller.

Figure 8:
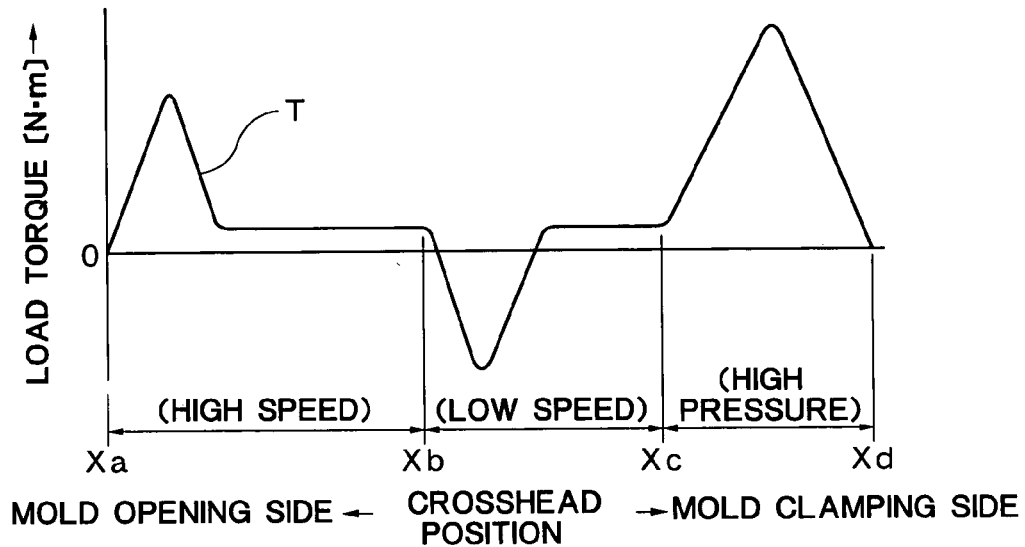
FIG. 8 is a graph used for explaining a conventional technique, the graph showing change in load torque with position of a crosshead.
Figure 9:
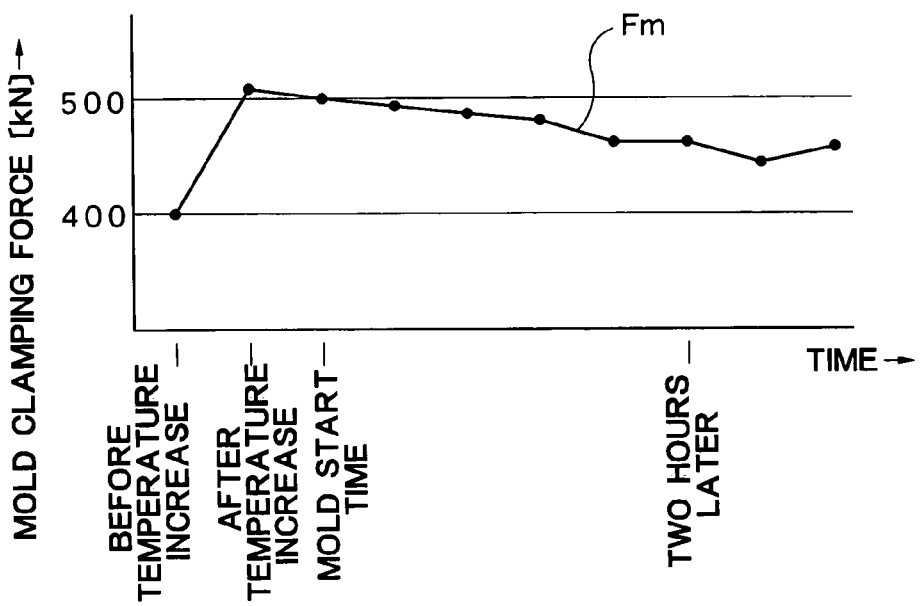
FIG. 9 is a graph used for explaining the problem of the conventional technique, the graph showing change in mold clamping force with time.

In FIG. 8, Pt denotes a signal output terminal used for detection of load torque T generated at the time of closure of the mold 1; Pv denotes a signal output terminal used for detection of velocity V of the movable platen 2 at the time of closure of the mold 1; Pa denotes a signal output terminal used for detection of acceleration A of the movable platen 2 at the time of closure of the mold 1; Pe denotes a signal output terminal used for detection of estimated torque E generated by disturbances at the time of closure of the mold 1; and Px denotes a signal output terminal used for detection of position deviation X of the movable platen 2 at the time of closure of the mold 1. Notably, operations (functions) of the respective sections will be described in the following description of overall operation of the mold clamping apparatus Mc.

Next, a mold clamping force correction method according to the present embodiment, along with operation (function) of the toggle-type mold clamping apparatus Mc, will be described with reference to FIGS. 1 to 7.

The controller 30 has a closure position detection mode. In the closure position detection mode, the controller 30 detects a closed point Cs of the mold 1 on the basis of a change in a physical quantity at the time of closure of the mold 1, detects the position of the crosshead 3 of the toggle mechanism L at the time of detection of the closed point Cs, and, from the detected position of the crosshead 3, obtains the position (closure position) of the movable platen 2 at the closed point Cs.

Load torque T is a preferable physical quantity which changes at the time of closure of the mold 1. A signal indicative of the load torque T is obtained from the signal output terminal Pt. The signal obtained from the signal output terminal Pt is fed to the controller 30. Meanwhile, a threshold Ts for the load torque T is set in the controller 30 (see FIG. 4). The threshold Ts is used for detecting the closed point Cs of the mold 1; i.e., an increase in the load torque T stemming from contact between the movable mold half 1m and the stationary mold half 1c. The threshold Ts can be set to an arbitrary level, and if necessary, can be set through trial mold clamping performed a predetermined number of times.

Figure 1:
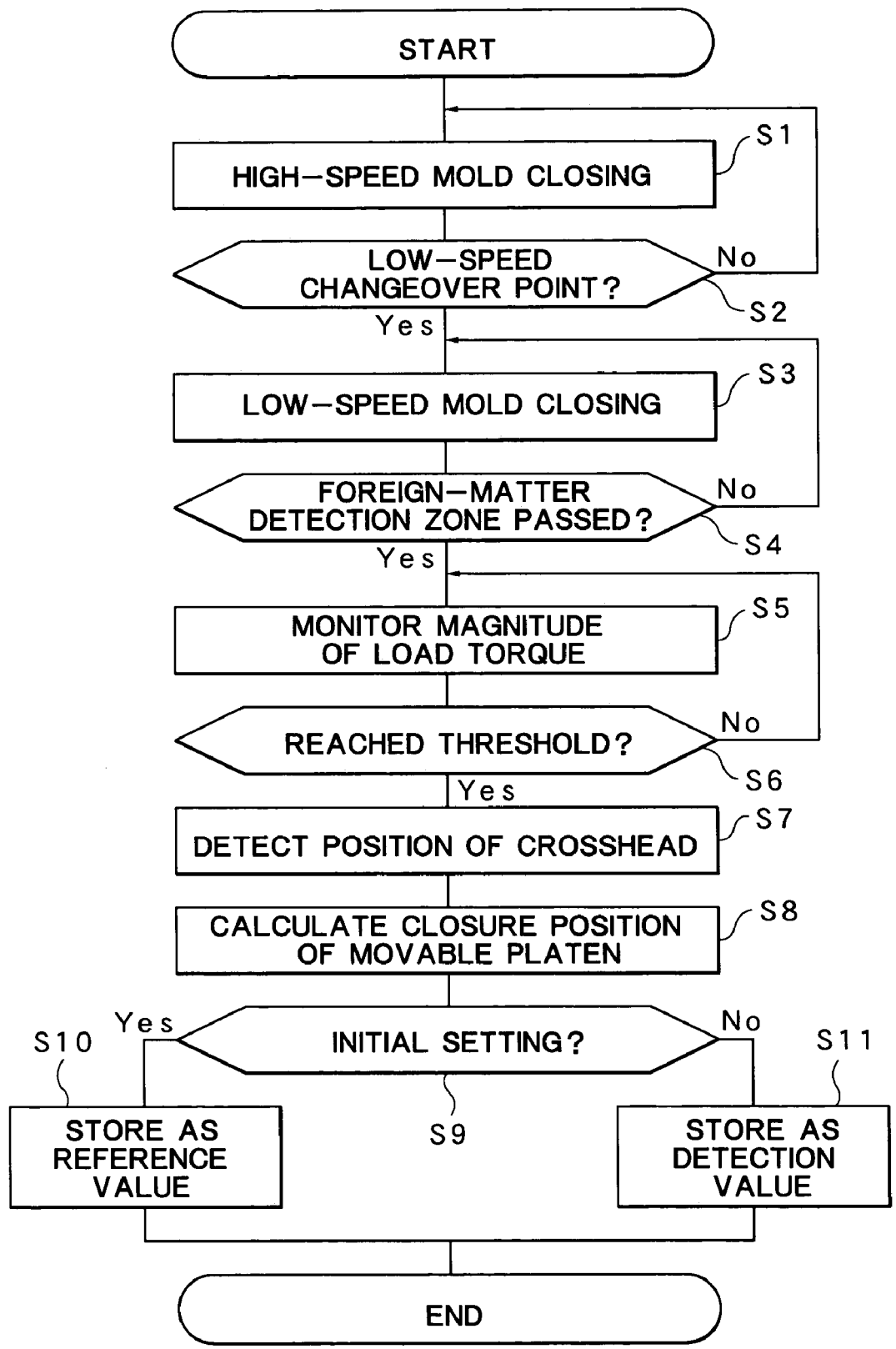
FIG. 1 is a flowchart showing the processing steps for a closure position detection mode performed in a mold clamping force correction method according to an embodiment of the present invention.

The processing steps for this closure position detection mode will now be described in accordance with the flowchart shown in FIG. 1 and with reference to FIGS. 4 to 7.

The mold 1 is assumed to be presently located at a mold open position (full open position). Therefore, the crosshead 3 of the toggle mechanism L is located at a mold open position Xa shown in FIG. 4. Upon start of mold clamping operation, the servomotor 4 is operated, so that the movable platen 2 advances from the mold open position in a mold closing direction. At this time, high-speed mold closing, in which the movable platen 2 advances at high speed, is first performed (step s1).

In this case, the servo circuit 31 performs velocity control and position control for the movable platen 2 (crosshead 3). That is, a position instruction value is fed from the sequence controller to the deviation calculation section 32 of the servo circuit 31, and is compared with the position detection value obtained on the basis of encoder pulses from the rotary encoder 5. As a result, a position deviation Xe is output from the deviation calculation section 32, and feedback control for position is performed on the basis of the position deviation Xe.

The position deviation Xe is amplified by means of the positional-loop-gain setting section 36 and fed to an input section of the adder 34. Moreover, the position instruction value is amplified by means of the feed-forward-gain setting section 37 and fed to another input section of the adder 34. An output of the adder 34 is fed to a non-inverted input section of the deviation calculation section 33 via the velocity limiter 38. Meanwhile, the position detection value is differentiated by means of the velocity converter 39 to thereby be converted to a velocity (velocity detection value) V, which is fed to an inverted input section of the deviation calculation section 33. As a result, a velocity deviation is output from the deviation calculation section 33, and feedback control for velocity is performed on the basis of the velocity deviation. Notably, the velocity V is limited by means of the velocity limiter 38.

The velocity deviation is amplified by means of the velocity-loop-gain setting section 40 and fed to an input section of the adder 35. Meanwhile, the velocity V is differentiated by means of the acceleration converter 44 to thereby be converted to an acceleration (acceleration detection value) A, which is fed to an input section of the disturbance monitoring section 43. The disturbance monitoring section 43 monitors the acceleration A. When the acceleration A anomalously changes because of a certain cause (disturbance), the disturbance monitoring section 43 outputs an estimated torque (torque value) E for accelerating return to the normal. This estimated torque E is fed to an input section of the adder 35 as a correction value. As a result, a torque instruction (instruction value) is output from the adder 35 and fed to the driver 42 via the torque limiter 41. With this, the servomotor 4 is driven and controlled, whereby position control and velocity control for the movable platen 2 (crosshead 3) are performed. Notably, the torque instruction output from the torque limiter 41 is fed back to an input section of the disturbance monitoring section 43.

Figure 4:
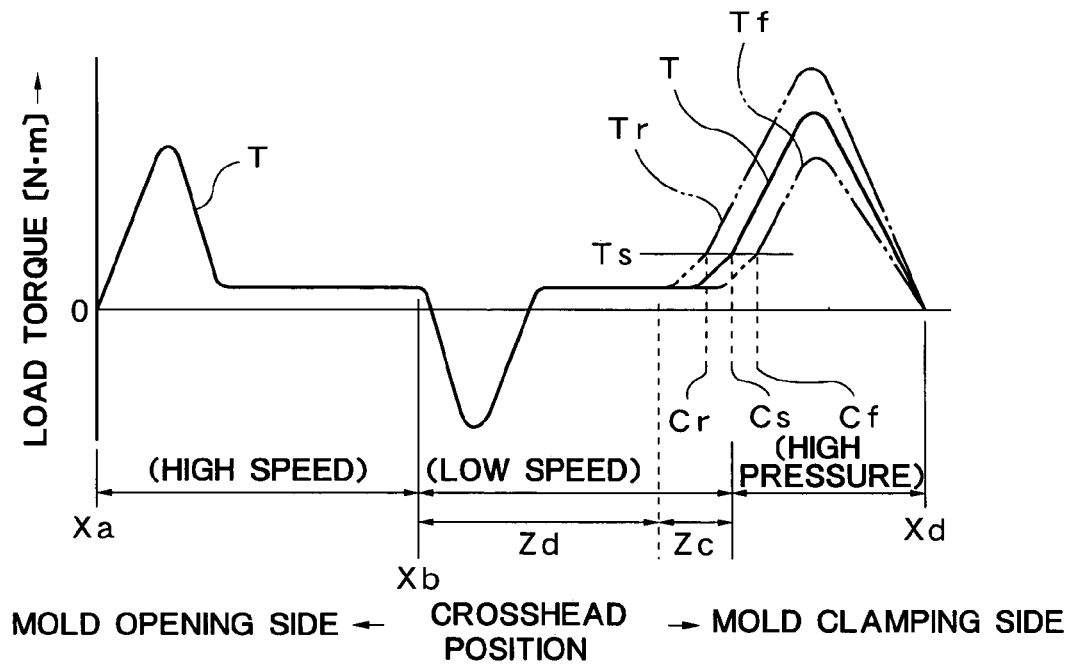
FIG. 4 is a graph used for explaining the mold clamping force correction method, the graph showing change in load torque with position of a crosshead.

Meanwhile, the crosshead 3 reaches a preset low-speed changeover point Xb as a result of advancement of the movable platen 2 in the mold closing direction, and operation for low-speed mold closing is started (steps S2 and S3). As shown in FIG. 4, the operation for low-speed mold closing is performed in a foreign object detection zone Zd and a closed point detection zone Zc. Specifically, processing for detecting a foreign object is performed in the foreign object detection zone Zd, and processing for detecting the closed point Cs of the mold 1 is performed in the closed point detection zone Zc.

That is, in the foreign object detection zone Zd, the magnitude of the load torque T is monitored. When the magnitude of the load torque T exceeds a preset threshold, foreign object is determined to be present, and processing for anomaly such as mold opening control is performed. Upon entry into the closed point detection zone Zc after passage of the foreign object detection zone Zd, monitoring for detecting the closed point Cs of the mold 1 is performed (steps S4 and S5). When the load torque T reaches a preset threshold Ts for closed point detection, the present point is detected as the closed point Cs of the mold 1. Upon detection of the closed point, high-pressure mold claming is started, and the position of the crosshead 3 at that time is detected (steps S6 and S7). Since the detection of the closed point Cs of the mold 1 and the detection of position of the crosshead 3 are performed simultaneously, the closure position corresponding to the closed point Cs can be accurately obtained even though the closure position of the movable platen 2 is obtained on the basis of the position of the crosshead 3. In addition, since the closed point detection zone Zc is provided after the foreign object detection zone Zd, the processing for detecting foreign object and the processing for detecting the closed point Cs according to the present invention can be performed in a stable and reliable manner without any interference therebetween. Notably, the end of the closed point detection zone Zc changes in accordance with the timing of detection of the closed point Cs.

Moreover, the position of the crosshead 3 is detected by use of encoder pulses output from the rotary encoder 5, which detects rotation of the servomotor 4 for mold clamping. In the present embodiment, the rotary encoder 5 is an incremental encoder; and the absolute position of the crosshead 3 is detected on the basis of the number of generated encoder pulses counted from the reference position. Use of such a rotary encoder 5 eliminates necessity of separate position detection means for detecting the position of the crosshead 3. The closure position of the movable platen 2 is calculated on the basis of the position of the crosshead 3 (step S8). Since a known conversion formula is provided for conversion between the position of the crosshead 3 and the position of the movable platen 2, the closure position of the movable platen 2 is calculated by use of the conversion formula.

When operation for the closure position detection mode is performed for initial setting; i.e., initial setting for obtaining a target mold clamping force Fm, the obtained closure position is set (stored) as a reference value Ds (steps S9 and S10). In contrast, when operation for the closure position detection mode is performed during production operation, the obtained closure position is stored and fed to the controller 30 as a detection value Dd (step S11). The above-description relates to the basic embodiment of the closure position detection mode. Notably, as will be described later, each of the reference value Ds and the detection value Dd may be obtained from the average of a plurality of closure positions obtained through performance of operation for the closure position detection mode a plurality of times.

Notably, in FIG. 4, load torque variation profiles Tf and Tr indicated by imaginary lines each show the case where the mold clamping force Fm has changed. The load torque variation profile Tr is a variation profile for the case where the mold 1 is heated and thermally expanded, and the load torque reaches the threshold Ts at a closed point Cr prior to the correct closed point Cs. In such a case, the mold clamping force Fm increases. The load torque variation profile Tf is a variation profile for the case where the tie bars 12 are heated and thermally expanded, and the load torque reaches the threshold Ts at a closed point Cf after the correct closed point Cs. In such a case, the mold clamping force Fm decreases. The above-described operation for the closure position detection mode can accurately detect such closed points Cs, Cf, and Cr, which relate to variation in the mold clamping force Fm.

Figure 5:
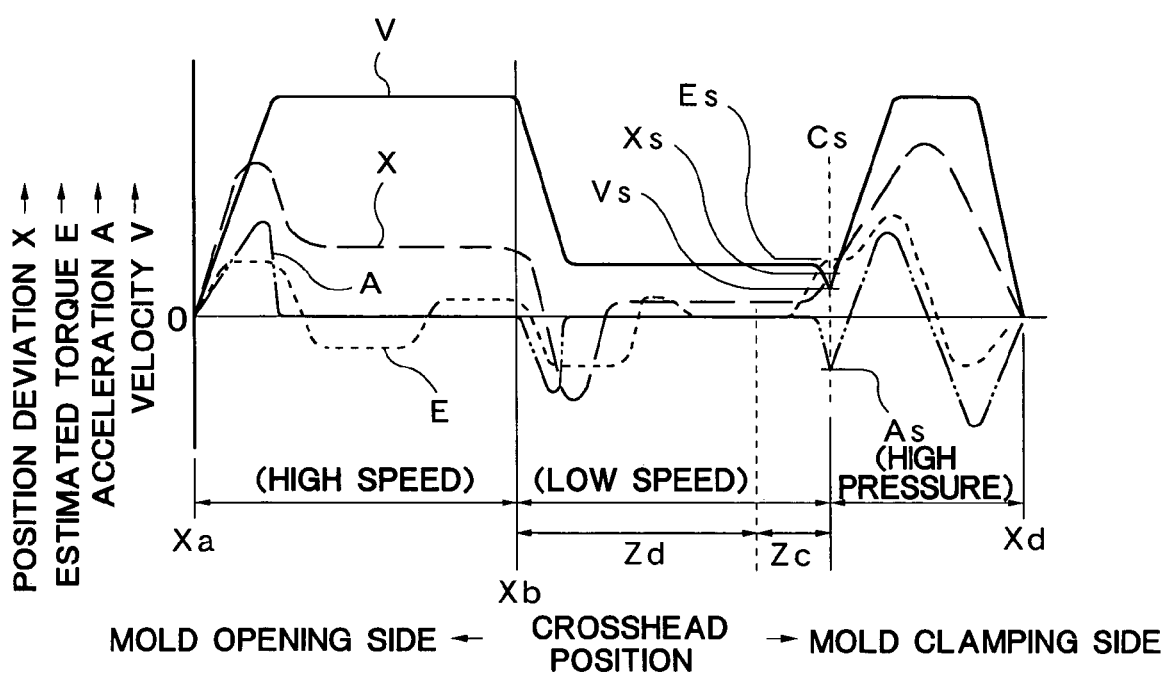
FIG. 5 is a graph used for explaining the mold clamping force correction method, the graph showing changes in various physical quantities with position of the crosshead.

The above-described detection of the closed point Cs utilizes an increase in the load torque T stemming from the closure of the mold 1; i.e., an increase in the load torque T stemming from contact between the movable mold half 1m and the stationary mold half 1c. However, physical quantities which change upon closure of the mold 1, other than the load torque T, are present. Examples of such physical quantities include velocity V of the crosshead 3 at the time of closure of the mold 1, acceleration A of the crosshead 3 at the time of closure of the mold 1, estimated torque E generated because of disturbance at the time of closure of the mold 1, and positional deviation X of the crosshead 3 at the time of closure of the mold 1. FIG. 5 shows changing profiles of these physical quantities. Like the case where the closed point Cs of the mold 1 is detected on the basis of the load torque T, the closed point Cs of the mold 1 can be detected on the basis of these physical quantities. Specifically, a threshold Vs (As, Es, Xs) is set for velocity V (acceleration A, estimated torque E, positional deviation X), and the closed point Cs of the mold 1 is detected on the basis of the fact that the velocity V (acceleration A, estimated torque E, positional deviation X) has reached the threshold Vs (As, Es, Xs). In this case, a signal indicative of the velocity V, acceleration A, estimated torque E, or positional deviation X can be obtained from the signal output terminal Pv, Pa, Pe, or Px. Notably, these physical quantities may be used singly or in combination. Combined use of these physical quantities enhances reliability.

Figure 2:
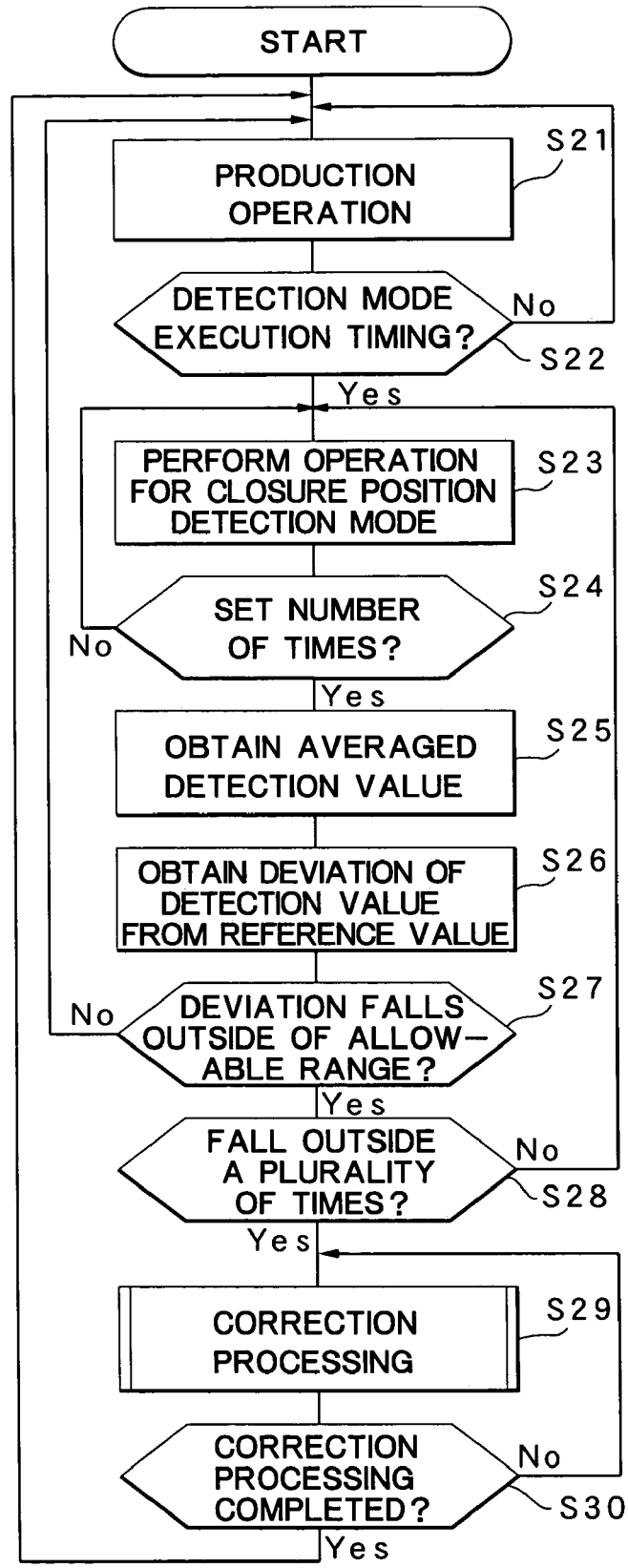
FIG. 2 is a flowchart showing the processing steps of the mold clamping force correction method.

Next, the processing steps of the mold clamping correction method using such closure position detection mode will be described in accordance with the flowchart of FIG. 2.

Production operation is assumed to be presently performed in an automatic molding mode (step S21). In this case, the above-described reference value Ds has already been set. During production operation, when a preset time for detection of closure position or a preset number of shots for detection of closure position is reached, operation for the closure position detection mode is automatically performed (steps S22 and S23). The intervals at which operation for the closure position detection mode is performed can be set in consideration of the degree of change in the mold clamping force F in an actual machine. In practice, several times of performance per day is sufficient. Notably, the execution intervals of the operation for the closure position detection mode may be set arbitrarily. For example, the operation for the closure position detection mode may be performed for every shot. Even when the operation for the closure position detection mod is performed for every shot, correction may be performed only a few times a day, which hardly influences production efficiency.

In the operation for the closure position detection mode, the detection value Dd regarding the closure position of the movable platen 2 is obtained in accordance with the above-described processing steps. In actuality, the operation for the closure position detection mode is performed a plurality of times (preset number of times), and the detection value Dd is obtained from the average of a plurality of closure positions thus obtained (steps S24 and S25). This operation enables obtainment of a reliable detection value Dd, from which noise components have been removed. Once the detection value Dd is obtained, a deviation Ke of the detection value Dd from the preset reference value Ds; i.e., Ke=Ds−Dd, is obtained (S26). Since an allowable range Re in relation to the deviation Ke has been previously set in the controller 30, the allowable range Re is compared with the deviation Ke so as to determine whether the deviation Ke falls outside the allowable range Re. When the deviation Ke falls within the allowable range Re, correction for the mold clamping force Fm is not performed. Accordingly, the production operation is continued under the same conditions (steps S27 and S21).

When the deviation Ke falls outside the allowable range Re, the detection value Dd is obtained again (steps S27, S28, and S23). That is, in the present embodiment, the detection value Dd is continuously obtained a plurality of times; and when the deviation Ke successively falls outside the allowable range Re a plurality of times, correction for the mold clamping force Fm is performed (step S29). For example, correction for the mold clamping force Fm is performed when two detection values Dd are successively detected and two deviations Ke obtained therefrom fall outside the allowable range Re. Accordingly, in the case where the deviation Ke falls outside the allowable range Re only one time, the deviation Ke is determined to have been produced a temporary factor such as disturbance, and correction is not performed. This operation enhances the stability and reliability of correction. Notably, processing for the closure position detection mode or correction processing is performed, and the automatic molding (production operation) is temporarily stopped, and resumed after completion of the processing for the closure position detection mode or the correction processing (steps S30 and S21).

Figure 3:
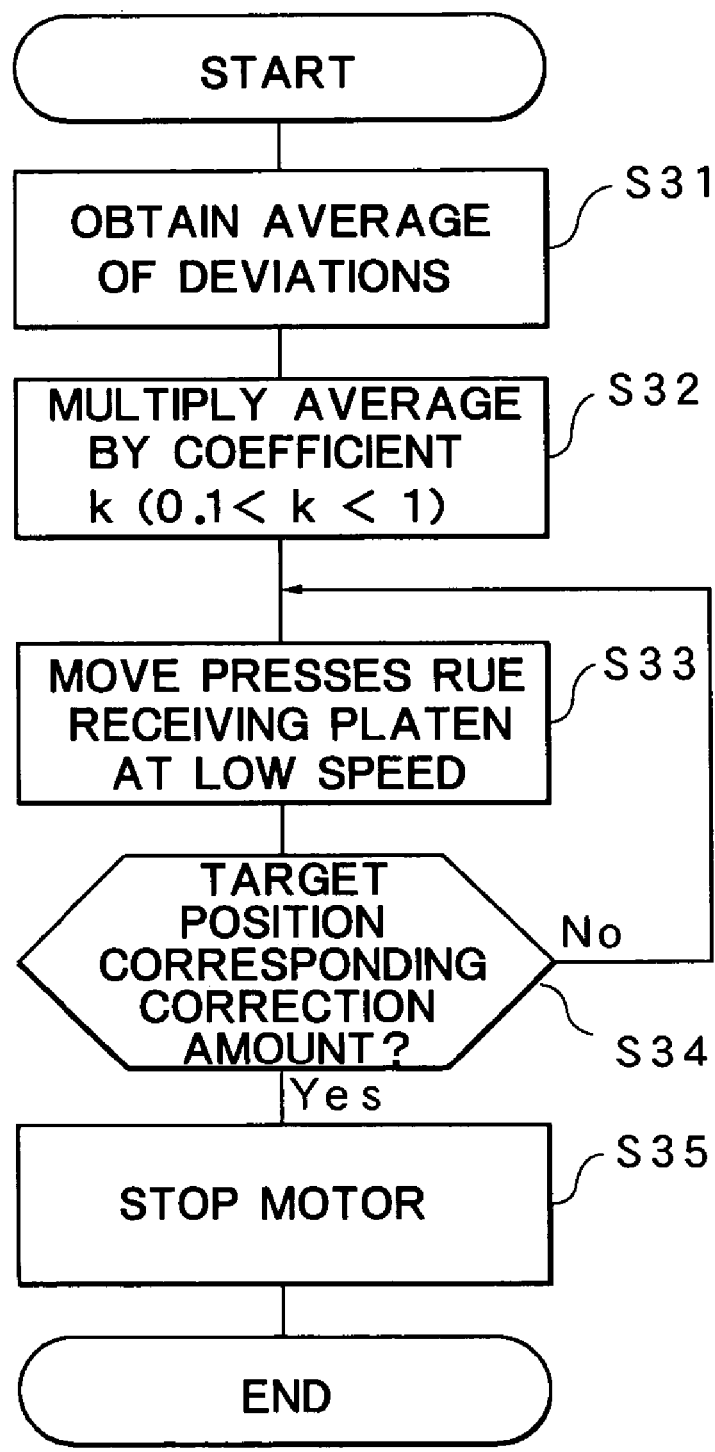
FIG. 3 is a flowchart showing the processing steps for correction performed in the mold clamping force correction method.

Next, the processing steps for correction of mold clamping force Fm will be described in accordance with the flowchart of FIG. 3.

Since in the present embodiment correction is performed when the deviation Ke falls outside the allowable range Re a plurality of times (e.g., two times), a plurality of the deviations Ke are obtained. Accordingly, in the present embodiment, the deviations Ke are averaged so as to obtain a mean value (step S31). Notably, in the case where a plurality of deviations are detected, their mean value or latest value may be used.

Incidentally, since the deviation Ke is a deviation of the position of the movable platen 2, the deviation Ke can be cancelled out through performance of correction in which the pressure-receiving platen 6 is moved by an amount corresponding to the deviation Ke. However, when the deviation Ke is used as a correction value as is, hunting may occur, and correction may become unstable. Therefore, the deviation Ke is multiplied by a coefficient k less than 1 (typically, $0.1 < k < 1$) so as to obtain a correction amount Ks smaller than the original deviation Ke, and correction is performed by use of the correction amount Ks (=Ke·k) (step S32).

When correction is performed, the drive motor 7 for moving the pressure-receiving platen is driven and controlled on the basis of the correction amount Ks so as to move the pressure-receiving platen 6 in a direction for reducing the deviation Ke (step S33). In this case, the pressure-receiving platen 6 is moved at speed lower than the ordinary speed; i.e., ordinary speed in ordinary molding operation, except in the case where the mold clamping force correction method according to the present embodiment is performed. The position of the pressure-receiving platen 6 is detected by use of encoder pulses output from the rotary encoder 8 attached to the drive motor 7, and feedback control for position is performed. The rotary encoder 8 is an incremental encoder; and the absolute position is detected on the basis of the number of generated encoder pulses counted from the reference position. When the pressure-receiving platen 6 has been moved to a target position corresponding to the correction amount Ks, the drive motor 7 is stopped (steps S34 and S35).

The above-described correction processing is performed automatically. This automatic correction enables timely and quick correction. Such automatic correction may be performed by making use of an existing automatic mold clamping force setting function (automatic mold thickness adjustment function) of the toggle-type mold clamping apparatus Mc. The automatic mold clamping force setting function is used, for example, at the time of mold exchange so as to set a target value of mold clamping force in an initial stage, to thereby automatically set the mold clamping force. When such an existing automatic mold clamping force setting function is utilized, in general, more accurate correction can be performed, although processing time required for correction tends to increase.

Meanwhile, instead of automatic correction, manual correction may be performed by an operator. In the case of manual correction, the allowable range Re for the deviation Ke is previously set, and when the deviation Ke falls outside the allowable range Re, this is reported by means of a warning. On the basis of this, the operator manually performs correction. In this case, correction can be performed on the basis of the operator's experience and know-how, and depending on the type of products to be molded, the operator may continue production without performance of correction. Therefore, production operation (automatic molding) is continued under the same conditions until the operator performs a certain operation for correction. Such manual correction and automatic correction may be used solely or in combination.

As described above, in the mold clamping force correction method for the toggle-type mold clamping apparatus Mc according to the present embodiment, displacement of the crosshead 3, which produces a larger displacement than does the mold 1 (movable platen 2), is detected, and the closed point Cs of the mold 1 is detected on the basis of change in a physical quantity at the time of closure of the mold 1. Therefore, the closure position of the movable platen 2 can be accurately detected. As a result, variation in the mold clamping force Fm can be accurately detected, and correction for the mold clamping force Fm can be accurately performed. In addition, since mold thickness detection means, such as a scale and a position detector, for directly detecting the thickness of the mold 1 becomes unnecessary, the number of parts can be reduced so as to lower cost. Moreover, the structure around the mold 1 can be prevented from becoming complex.

While the present invention has been described with reference to the preferred embodiment, the present invention is not limited thereto. Regarding structural details, shape, the number of parts, numerical values, among others, modifications and any omission or addition may be possible as needed without departing from the scope of the invention.

For example, in the above-described embodiment, output (for torque monitor) of the driver 42 is utilized to detect the load torque T. However, torque instruction serving as an input of the torque limiter 41 may be used. Moreover, after completion of correction for the mold clamping force Fm, there may be added a step for performing mold clamping operation a predetermined number of times so as to check whether correction has been performed correctly. Moreover, upon completion of correction for the mold clamping force Fm, high-pressure mold clamping and mold opening may be performed before resumption of automatic molding.

What is claimed is:

1. A mold clamping force correction method for a toggle-type mold clamping apparatus including a movable platen and a toggle mechanism for moving the movable platen in which change in mold clamping force is detected during production operation, and the mold clamping force is corrected on the basis of the detected change, the method comprising:

moving a crosshead in a mold closing direction at a first speed until reaching a crossover point;

moving the crosshead at a second speed less than the first speed until a preset threshold is reached, the preset threshold being a threshold for change that has been set in advance in each of at least one physical quantity, and the closure of the mold being detected on the basis of detection of the change in the at least one physical quantity having reached the preset threshold;

outputting an estimated torque (E) based on detection of an anomalous change in acceleration (A) of the crosshead at a time of closure of the mold;

providing a closure position detection mode for detecting closure of a mold on the basis of a change in at least one physical quantity because of closure of the mold, detecting a position of the crosshead of the toggle mechanism at the time of detection of the closure of the mold, and obtaining, as a closure position, a position of the movable platen at the time of the closure of the mold from the detected position of the crosshead;

previously operating the mold clamping apparatus in the closure position detection mode so as to store, as a reference value, a closure position at which a target mold clamping force is obtained;

operating, in the production operation, the mold clamping apparatus in the closure position detection mode so as to obtain an actual closure position as a detection value; and correcting the mold clamping force on the basis of a deviation of the detection value from the reference value, wherein the at least one physical value includes the estimated torque (E) based on the detection of the anomalous change in the acceleration (A) of the crosshead, the anomalous change in the acceleration (A) being detected when the change in the acceleration (A) reaches the preset threshold.

2. A mold clamping force correction method for a toggle-type mold clamping apparatus according to claim 1, wherein the at least one physical quantity includes a load torque (T) at the time of closure of the mold.

3. A mold clamping force correction method for a toggle-type mold clamping apparatus according to claim 1, wherein the at least one physical quantity includes the second speed of the crosshead at the time of closure of the mold.

4. A mold clamping force correction method for a toggle-type mold clamping apparatus according to claim 1, wherein the at least one physical quantity includes the acceleration (A) of the crosshead at the time of closure of the mold.

5. A mold clamping force correction method for a toggle-type mold clamping apparatus according to claim 1, wherein the at least one physical quantity includes a position deviation (X) of the crosshead at the time of closure of the mold.

6. A mold clamping force correction method for a toggle-type mold clamping apparatus according to claim 1, wherein the mold is closed at the second speed until the closure is detected, and is clamped under high pressure after detection of the closure.

7. A mold clamping force correction method for a toggle-type mold clamping apparatus according to claim 1, wherein the position of the crosshead is detected by use of encoder pulses output from a rotary encoder which detects rotation of a servomotor for mold clamping.

8. A mold clamping force correction method for a toggle-type mold clamping apparatus according to claim 1, wherein the detection value is obtained from an average of a plurality of closure positions obtained through repeated performance of operation in the closure position detection mode a plurality of times.

9. A mold clamping force correction method for a toggle-type mold clamping apparatus according to claim 1, wherein an allowable range is set for the deviation, and when the deviation falls outside the allowable range, the correction step is performed.

10. A mold clamping force correction method for a toggle-type mold clamping apparatus according to claim 9, wherein the deviation is continuously obtained a plurality of times, and when the deviation continuously falls outside the allowable range twice or more, the correction step is performed.

11. A mold clamping force correction method for a toggle-type mold clamping apparatus according to claim 1, wherein an allowable range is set for the deviation, and when the deviation falls outside the allowable range, this fact is reported to an operator, whereby the operator is allowed to perform correction manually.

12. A mold clamping force correction method for a toggle-type mold clamping apparatus according to claim 1, wherein the correction step is performed automatically by moving a pressure-receiving platen toward a direction for reducing the deviation.

13. A mold clamping force correction method for a toggle-type mold clamping apparatus according to claim 12, wherein the correction step is performed by moving the pressure-receiving platen on the basis of a correction amount obtained by multiplying the deviation by a coefficient less than 1.

14. A mold clamping force correction method for a toggle-type mold clamping apparatus according to claim 12, wherein the pressure-receiving platen is moved at a speed lower than the second speed.

15. A mold clamping force correction method for a toggle-type mold clamping apparatus according to claim 12, wherein the position of the pressure-receiving platen is detected by use of encoder pulses output from a rotary encoder which detects rotation of a drive motor for moving the pressure-receiving platen.

16. A mold clamping force correction method for a toggle-type mold clamping apparatus according to claim 1, wherein the correction step is performed automatically by use of an existing automatic mold clamping force setting function of the toggle-type mold clamping apparatus.

17. A mold clamping force correction method for a toggle-type mold clamping apparatus according to claim 1, further comprising the step of sequentially moving the crosshead through three predetermined zones starting at an open position and ending at the closure position, the three zones including:
a high speed zone beginning at the open position,
a foreign object detection zone following the high speed zone, and
a closed zone following the foreign object detection zone and ending at the closure position at which the target mold clamping force is obtained.

18. A mold clamping force correction method for a toggle-type mold clamping apparatus including a movable platen and a toggle mechanism for moving the movable platen in which change in mold clamping force is detected during production operation, and the mold clamping force is corrected on the basis of the detected change, the method comprising:
moving a crosshead in a mold closing direction at a first speed until reaching a crossover point;
moving the crosshead at a second speed less than the first speed until a preset threshold is reached, the preset threshold being a threshold for change that has been set in advance in each of at least two physical quantities, and the closure of the mold being detected on the basis of detection of the change in the at least two physical quantities having reached the preset threshold;

providing a closure position detection mode for detecting closure of a mold on the basis of a change in at least two physical quantities because of closure of the mold, detecting a position of the crosshead of the toggle mechanism at the time of detection of the closure of the mold, and obtaining, as a closure position, a position of the movable platen at the time of the closure of the mold from the detected position of the crosshead;

previously operating the mold clamping apparatus in the closure position detection mode so as to store, as a reference value, a closure position at which a target mold clamping force is obtained;

operating, in the production operation, the mold clamping apparatus in the closure position detection mode so as to obtain an actual closure position as a detection value; and correcting the mold clamping force on the basis of a deviation of the detection value from the reference value, wherein the mold is closed at the second speed until the closure is detected, and is clamped under high pressure after detection of the closure, wherein when the mold is closed at the second speed, foreign object is detected in a foreign object detection zone, and the closure of the mold is detected in a closure point detection zone subsequent to the foreign object detection zone, wherein the at least two physical quantities include:
  an estimated torque (E) based on detection of an anomalous change in acceleration (A) of the crosshead at a time of closure of the mold, and
  the acceleration (A) of the crosshead at the time of closure of the mold, the anomalous change in the acceleration (A) being detected when the change in the acceleration (A) reaches the preset threshold.

* * * * *